United States Patent [19]

Nienhaus et al.

[11] Patent Number: 4,792,006
[45] Date of Patent: Dec. 20, 1988

[54] DRIVE SHAFT COUPLING

[75] Inventors: Clemens Nienhaus; Theo Buthe, both of Lohmar; Felix Mikeska, Siegburg, all of Fed. Rep. of Germany

[73] Assignee: Jean Waltersheid GmbH, Lohmar, Fed. Rep. of Germany

[21] Appl. No.: 99,478

[22] Filed: Sep. 22, 1987

[30] Foreign Application Priority Data

Sep. 25, 1986 [DE] Fed. Rep. of Germany ....... 3632550

[51] Int. Cl.⁴ .............................................. B62D 49/06
[52] U.S. Cl. .................................... 180/53.3; 180/900
[58] Field of Search ................... 180/53.3, 53.6, 53.61, 180/53.62, 53.7, 900; 403/292, 297, DIG. 4; 464/169, 172, 901; 280/482

[56] References Cited

U.S. PATENT DOCUMENTS

| 2,462,588 | 2/1949 | Wondra | 180/53.3 |
| 4,071,105 | 1/1978 | von Allworden | 180/53.3 |
| 4,090,725 | 5/1978 | Perin | 180/53.3 |
| 4,126,057 | 11/1978 | von Allworden et al. | 280/482 |

FOREIGN PATENT DOCUMENTS

| 2537841 | 2/1976 | Fed. Rep. of Germany . |
| 1088954 | 10/1967 | United Kingdom . |
| 1096102 | 12/1967 | United Kingdom . |
| 2134217 | 4/1986 | United Kingdom . |

Primary Examiner—Kenneth R. Rice
Attorney, Agent, or Firm—Toren, McGeady & Associates

[57] ABSTRACT

A coupling device for connecting the power take off means of an agricultural tractor to a driven shaft of an implement includes an upper guide member 20 connected between the tractor and the implement from which the drive shaft 16 is resiliently supported by the springs 42. The guide member 20 is telescopic and is lockable, when the tractor is coupled to the implement, by means of a lever arm 40 to which the springs 42 are connected. In the coupled condition the lever arm is retracted thereby releasing the drive shaft 16 from the resilient bias of the springs 42 and thereby releasing the drive shaft bearings from any spring loading during operation.

3 Claims, 2 Drawing Sheets

DRIVE SHAFT COUPLING

BACKGROUND OF THE INVENTION

1. Field of the Invention

This invention relates to a coupling device for connecting the power power take off means of an agricultural tractor to a driven shaft of an implement to be powered by the tractor power take off means. Such a coupling device includes an upper guide member pivotally mounted at its one end of the tractor and connectable at its other end to the implement either directly or through a coupling frame and, when a coupling frame is utilized the frame is conveniently further supported by a pair of lower guide members connected between the tractor and the frame. Such a coupling device further includes a drive shaft on the tractor connected to the power take off means thereof through a universal joint and being of a type which is automatically engageable with the driven shaft of the implement when the upper guide member and/or the coupling frame is connected to the implement.

2. Description of the Prior Art

Automatic drive shaft coupling devices per se are known and, for example, in GB-A-No. 2134217 there is disclosed a coupling device wherein both the drive shaft of the tractor and the driven shaft of the implement are suspended by resilient supports for alignment with one another during the coupling operation. However, after coupling has been effected, the drive shaft and the driven shaft remain in a resiliently supported condition. In operation, due to the relative articulation of the coupled drive shaft and driven shaft relative to the tractor and to the implement, unacceptably high resilient bias may continue to be applied to the shafts with consequential risk of overloading of the shaft and guard tube bearings.

A further type of coupling device is disclosed in DE-A-No. 2537841 in which the driven shaft on the implement is supported in the coupling position by a pivotal support. During the coupling operation such support is tilted by means of a lever which effectively shortens the length of the drive shaft train.

SUMMARY OF THE INVENTION

It is an object of the present invention to provide a coupling device having resilient support means for the drive shaft wherein, after coupling has been effected to the driven shaft of the implement, the resilient bias of the support means is released from the drive shaft.

In accordance with the invention, there is provided a coupling device for connecting power take off means of a tractor to a driven shaft of a implement to be powered by the tractor power take off means comprising an upper guide member having a first part pivotally connectable to the tractor and a second part connectable to the implement, said first and second parts being telescopically connected together and resiliently biased axially apart; a drive shaft driven by the tractor power take off means and being engageable, when the tractor is connected to the implement by said guide member, with the driven shaft of the implement; locking means on said guide member selectively operable to lock said first and second parts thereof against relative axial movement; an actuating lever arm carried by said guide member for selective operation of said locking means, said lever arm being movable between an extended position in which said locking means is inoperative and a retracted position in which said locking means is operative; resiliently biased support means extending between said lever arm and said drive shaft whereby, when said guide member is disconnected from the implement and said lever arm is in its extended position, said drive shaft is suspended by said support means from said guide member and, when said guide member is connected to the implement and said drive shaft is engaged with the implement driven shaft and when said lever arm is in its retracted position, said drive shaft is released from the resilient bias of said support means.

The upper guide member of the coupling device preferably comprises part of a coupling frame connectable to cooperating means on the implement, said frame including a pair of lower guide members connectable between the tractor and the frame. The lever arm is conveniently actuable remotely from the tractor.

BRIEF DESCRIPTION OF THE DRAWINGS

Other features of the invention will become apparent from the following description, given herein solely by way of example, with reference to the accompanying drawings, wherein.

DESCRIPTION OF PREFERRED EMBODIMENTS

Figure 1:
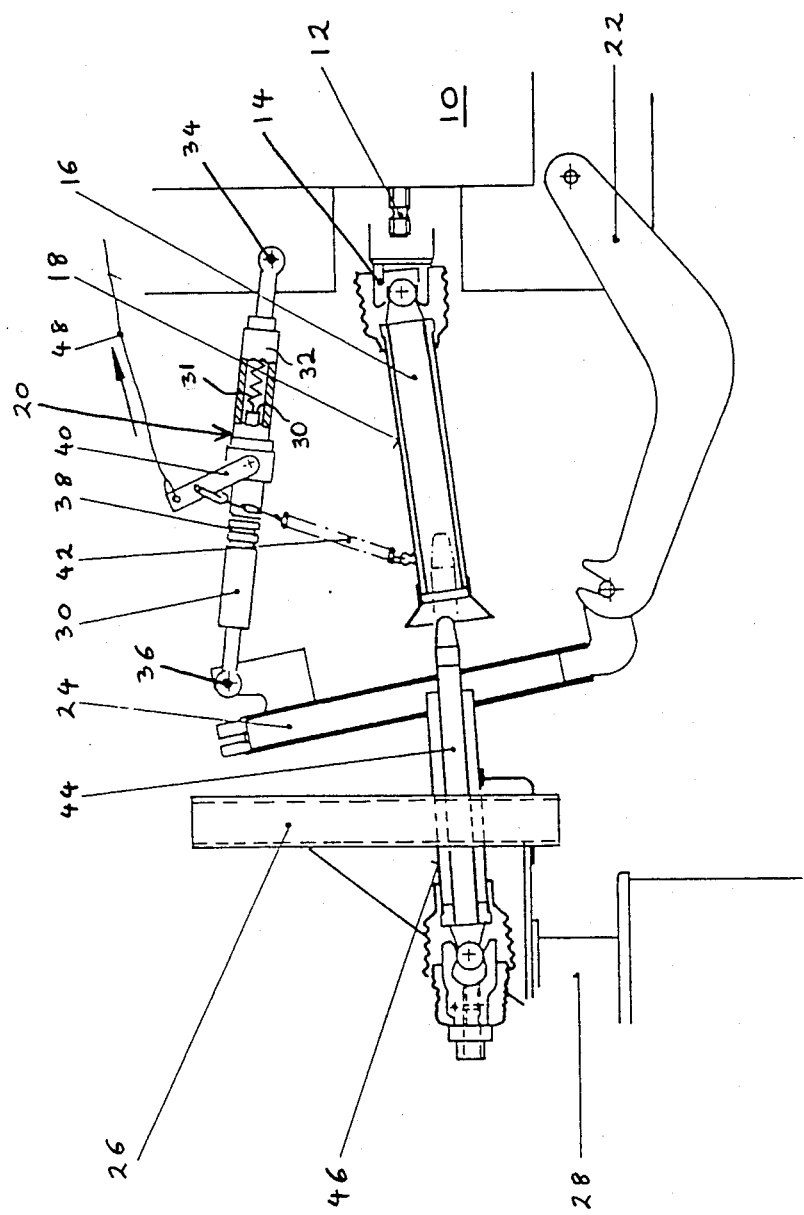
FIG. 1 is a diagrammatic side view of a coupling device in accordance with the invention shown in position prior to engagement with an implement.

Referring to the drawings, there is shown, digrammatically, part of a tractor 10 having conventional power take off means 12 to which is connected a universal joint 14 and a drive shaft 16 having a known type of guard tube 18 arranged around the shaft. The coupling device includes an upper guide member 20 and a pair of laterally spaced lower guide members 22 forming a three part linkage connected to a triangular coupling frame 24 for engagement with a cooperating frame 26 on an implement 28.

The upper guide member 20 is conveniently of the type described and illustrated in U.S. Pat. No. 4,126,057, the subject matter of which is incorporated herein by reference. The guide member comprises inner and outer tubular elements 30 and 32 respectively, and an internal compression spring 31 acting to bias said elements 30 and 32 telescopically apart. As illustrated herein, the outer tubular element 32 is pivotally connected at its outer end 34 to the tractor and the inner tubular element 30 is pivotally connected at its outer end 36 to the upper apex of the triangular frame 24. The inner element 30 is provided with a plurality of axially spaced annular grooves 38 which are selectively engageable by locking jaws carried on the outer element 32 selectively movable between operative and inoperative positions by means of an actuating lever arm 40 pivotally mounted on the outer element 32.

The lever arm 40 projects upwardly from the outer element 32 and, in the extended position shown in FIG. 1 of the drawings, operates to render the locking means inoperative whereby the inner element 30 of the guide member 20 is freely telescopically movable relative to the outer element 32 against the bias of the compression spring 31.

The drive shaft 16 and guard tube 18 are supported from the upper guide member 20 by means of a resilient support 42 extending from the guard tube 18 to a point intermediate the ends of the lever arm 40. In the position shown in FIG. 1 of the drawings, the lever arm 40 is in its extended position with the inner and outer elements 30 and 32 of the upper guide member 20 unlocked and the drive shaft 16 suspended by the resilient support means 42.

When it is desired to couple an implement 28 to the tractor 10, the tractor is driven towards the implement and the coupling frame 24 is raised into engagement with the cooperating frame 26 on the implement by powering the coupling frame 24 upwardly by means of the lower guide members 22 which are conveniently hydraulically powered from the tractor. At the same time the drive shaft 16 is guided onto the driven shaft 44 of the implement (as shown in chain dot outline in FIG. 1) to establish a driving torque 44 connection between the drive shaft 16 and driven shaft 44, such connection conveniently being effected by means of known profile configurations to the drive shaft and driven shaft. As illustrated, the driven shaft 44 is also provided with a guard tube 46 so that both the drive shaft 16 and driven shaft 44 may be fully enclosed when connected together.

Figure 2:
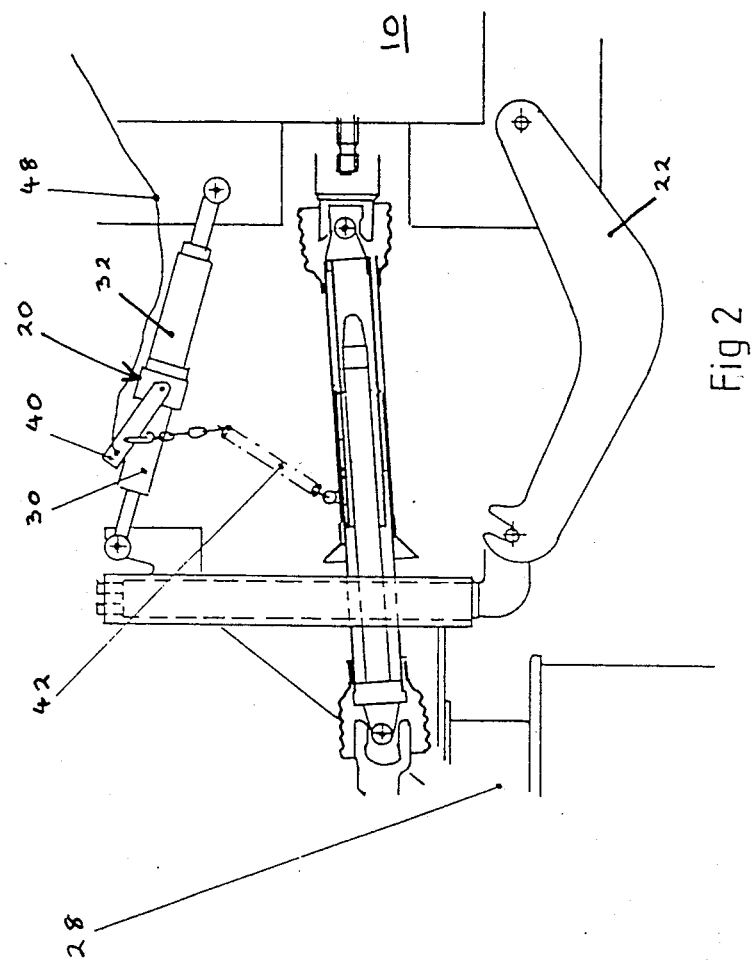
FIG. 2 is a similar diagrammatic side view showing the coupling device connected to the implement with the tractor drive shaft engaged with the implement driven shaft.

The fully coupled condition is shown in FIG. 2 of the drawings wherein the inner element 30 of the upper guide member 20 has been retracted into the outer element 32 against the bias of the compression spring 31. When coupling has been fully effected, the lever arm 40 is released from its extended position, either manually remotely from the tractor cab by means of a cable 48, or automatically, at which time the lever arm 40 will move into its retracted position permitting the locking means to move into their operative positions to clamp the grooves 38 on the inner element 30 and lock the upper guide member 20 in a rigid condition. Movement of the lever arm 40 to its retracted position effectively shortens the length of the resilient support means 42 thereby releasing the drive shaft 16 and guard tube 18 from the resilient bias of the support means 42 as is clearly shown in FIG. 2. Hence, in operation in the coupled condition, neither the drive shaft bearings nor the driven shaft bearings nor the guard tube bearings are subject to any tensile forces applied thereto by the support means 42.

We claim:

1. A coupling device for connecting power take off means of a tractor to a driven shaft of an implement to be powered by the tractor power take off means comprising an upper guide member having a first part pivotally connectable to the tractor and a second part connectable to the implement, said first and said second parts being telescopically connected together and resiliently biased axially apart; a drive shaft driven by the tractor power take off means and being engageable, when the tractor is connected to the implement by said guide member, with the driven shaft of the implement; locking means on said guide member selectively operable to lock said first and said second parts thereof against relative axial movement; an actuating lever arm carried by said guide member for selective operation of said locking means, said lever arm being movable between an extended position in which said locking means is inoperative and a retracted position in which said locking means is operative; and resiliently biased support means extending between said lever arm and said drive shaft, said support means resiliently suspending said drive shaft from said guide member when said guide member is disconnected from the implement and said lever arm is in its extended position, and not resiliently suspending said drive shaft when said guide member is connected to the implement, said drive shaft is engaged with the implement driven shaft and said lever arm is in its retracted position.

2. A coupling device as claimed in claim 1 wherein said guide member comprises part of a coupling frame connectable to cooperating means on the implement, said frame including a pair of lower guide members connectable between the tractor and the frame.

3. A coupling device as claimed in either one of claims 1 or 2, wherein means are provided for actuating said lever arm remotely from the tractor.

* * * * *